J. R. ADAMS.

PILLOW SHAM FRAME AND HOLDER.

No. 9,793. Reissued July 12, 1881.

WITNESSES

Villette Anderson

James J. Sheehy

INVENTOR

John R. Adams.

by Anderson & Smith his ATTORNEYS

N. PETERS, Photo-Lithographer, Washington, D. C.

UNITED STATES PATENT OFFICE.

JOHN R. ADAMS, OF OAKLAND, CALIFORNIA.

PILLOW-SHAM FRAME AND HOLDER.

SPECIFICATION forming part of Reissued Letters Patent No. 9,793, dated July 12, 1881.

Original No. 222,222, dated December 2, 1879. Application for reissue filed June 11, 1881.

*To all whom it may concern:*

Be it known that I, JOHN R. ADAMS, of Oakland, in the county of Alameda and State of California, have invented certain new and useful Improvements in Pillow-Sham Frames and Holders; and I do hereby declare the following is a full, clear, and exact description of the invention that will enable others skilled in the art to which it appertains to make and use the same, reference being had to the accompanying drawings, and to the letters of reference marked thereon, which form a part of this specification.

My invention relates to a new and improved frame for the purpose of keeping pillow covers or shams in a proper slanting position at the head of the bed during the day, and for allowing them to be turned up and out of the way at night.

Letters Patent of the United States No. 214,800, and bearing date the 29th day of April, 1879, were granted to me for an invention in the same class; but the object of my present improvement is to provide for holding the shams in an elevated position, or at any desired angle of inclination, substantially as hereinafter more fully set forth.

Figure 1:
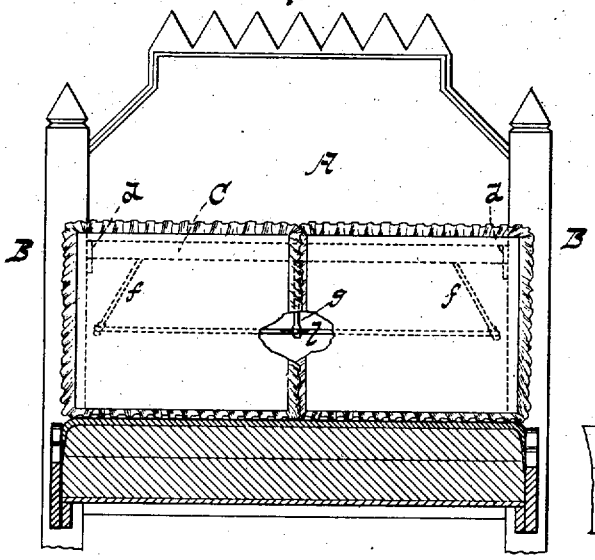
Figure 2:
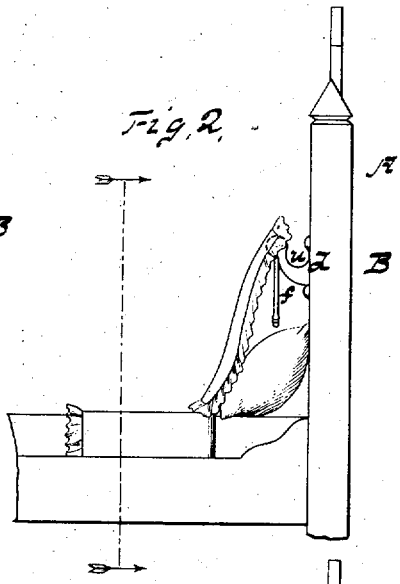
Figure 3:
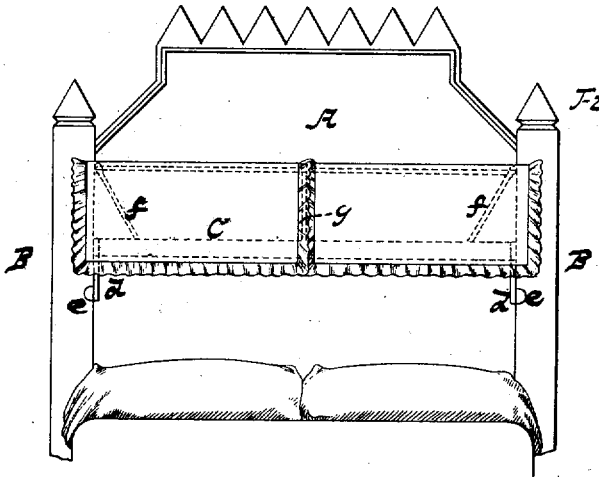
Figure 4:
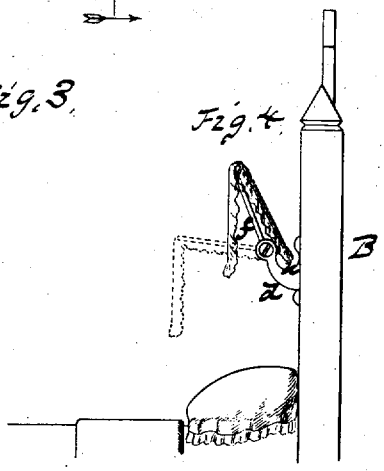
Figure 5:
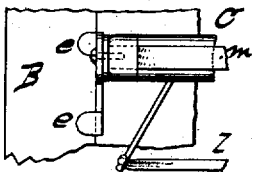
Figure 6:
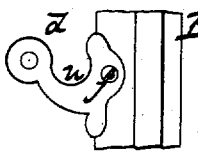
Figure 7:
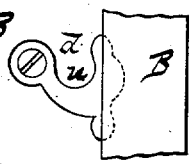
Figure 8:
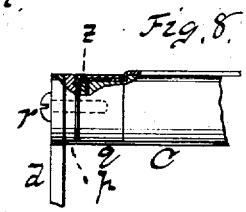

Referring to the accompanying drawings, Figure 1 is a front view of the head-board of a bedstead with my invention attached thereto. Fig. 2 is a side view of the frame, taken from the right-hand side of Fig. 1. Fig. 3 is a front view with the frame raised. Fig. 4 is a side view, taken from the right-hand side of Fig. 3. Fig. 5 is a detail view, showing one end of the frame and its supporting-bracket. Figs. 6 and 7 are detail views of the brackets. Fig. 8 is a detail showing the frictional devices.

Let A represent the head-board of a bedstead, and B B the bed-posts. C is a bar, which is secured to the bed-posts by means of brackets *d d*. This bar is secured to these bearings by a frictional device, hereinafter described, which enables the bar to rotate in a vertical plane. The bar C forms one side of the frame—that which is parallel with the head-board and distant from it about three-quarters of an inch. To form the other three sides of the frame, I secure two pieces of spring-wire, *f f*, one at or near each end of the bar C, and extending from the bar at an angle outward, as shown at Fig. 2. I also secure another piece of spring-wire, *g*, slightly shorter than the other two, at the middle of the bar C.

This middle piece of wire extends from the bar radially outward, and at its extremity, as well as at the extremities of the pieces *f f*, I make a slight burr or indentation. I then join the ends of the wires *f f* by a piece of tape, *l*, which is looped over the end of the wire *g* and fastened to the ends of the wires *f f*, which are then drawn together, so that there will always be a sufficient strain to keep the tape taut. The slight burr raised on the end of each wire will keep the tape *l* in position, and prevent it from slipping when stretched. In this fashion I provide a light and yet substantial frame, which can be easily repaired by any housekeeper, if it should happen to get out of order. I also secure a piece of tape, *m*, longitudinally on the bar C by means of small tacks driven about two inches apart. The extremities of this piece of tape will be fastened under the ferrules which form part of the frictional devices at each end of the bar C, as hereinafter described.

The pillow-sham frame formed by the bar C, the wires *f f* and *g*, and the tape *l*, will extend from one bed-post to the other, and will therefore be as wide as the head-board itself. Its length will be about half that of the shams which it is intended to hold—that is to say, about half the distance from the supporting-brackets to the bed. When the shams are fastened to the tape *m* by pins, in the usual way, and when the frame is raised, the shams will fold over the stretched tape *l* and hang over the other side of the frame so as to conceal it. The shams, as above stated, will be attached to the tape *m* by pins, or otherwise, and their edges will extend about half or three-quarters of an inch above and beyond the tape, so as to conceal the bar C when the frame is down and the shams are in the proper slanting positions over the pillows.

In order to prevent the crumpling of the edges of the shams against the supports of the bar, I make the brackets *d d* curved, and provide them with recesses *n*, into which the edge of the sham will lodge when the frame is raised upward.

The brackets *d d* are made with projections *e e* bent at right angles, as shown in Figs. 2, 4, 6, and 7. These projections or lugs lie against the angular edge of the bed-post B, and the bracket is fastened to the side of the bed-post by a single screw, *j*. When it is not found convenient to attach the brackets to the bed-post I provide brackets bent at right angles to the screw-plate, which can be fastened directly to the head-board of the bedstead.

The frictional device is as follows: A disk of metal, *p*, with a round hole bored out at its center, is placed over the extremity of the bar C. A ferrule, *q*, with its edge flaring inward, is then placed over both the disk *p* and the bar C, and holds the disk tightly in place. As above mentioned, the end of the tape *m* is placed under the disk *p* and ferrule *q* before securing those to the bar C. A screw, *r*, passes through the bracket *d* and disk *p* and screws into the bar C. Between the ferrule *q* and the bracket I interpose a disk or washer, *t*, preferably made of leather or other equivalent substance. This disk *t* will then be pressed between the flaring edge of the ferrule *q* and the head of the bracket, which is made to correspond in diameter with the ferrule, as shown. By this method of applying the pressure to the circumference of the washer *t*, instead of to its center, a sufficient amount of friction can be produced that will hold the frame in a vertical position, or at any desired angle, without the use of catches or similar devices.

Having thus described my invention, what I claim as new, and desire to secure by Letters Patent, is—

1. In a pillow-sham holder, the combination, with the bar C and bracket having a disk or plate, *p*, of the washer *t*, ferrule *q*, and screw *r*, substantially as and for the purpose set forth.

2. The combination, with the roll or bar C and support B, of the brackets *d d*, provided with the right-angled flanges or lugs *e e*, substantially as and for the purpose set forth.

3. The combination, with the sham and its frame, of the roll or bar C, ferrule *q*, disk *p*, washer *t*, screw *r*, and brackets *d d*, having the curved recesses *n*, substantially as and for the purpose set forth.

4. In a pillow-sham holder, the combination, with the independent spring-arms *f f*, at the ends of the holder-frame, of the tape *l*, connecting the ends of said arms, and forming the outer side of the holder, substantially as specified.

5. The combination, with the supporting-bearings, of a pivoted pillow-sham-holder frame of a length about equal to half the distance from the bearings to the bed-surface, whereby the sham is enabled to fold over the frame when raised, substantially as specified.

6. A pillow-sham frame pivoted on brackets and provided with frictional devices, substantially as described, to hold it in any desired position.

7. The combination, with a pivoted pillow-sham frame, of the brackets *d*, having curved recesses *n* in rear of the bearings for the holder-frame, substantially as specified.

In testimony whereof I affix my signature in presence of two witnesses.

JOHN R. ADAMS.

Witnesses:

JOSEPH S. WILLIAMS,
CHARLES F. DODGE.